May 6, 1924.
J. MARTELLI
ICE CREAM TONGS
Filed Jan. 25, 1922
1,493,362
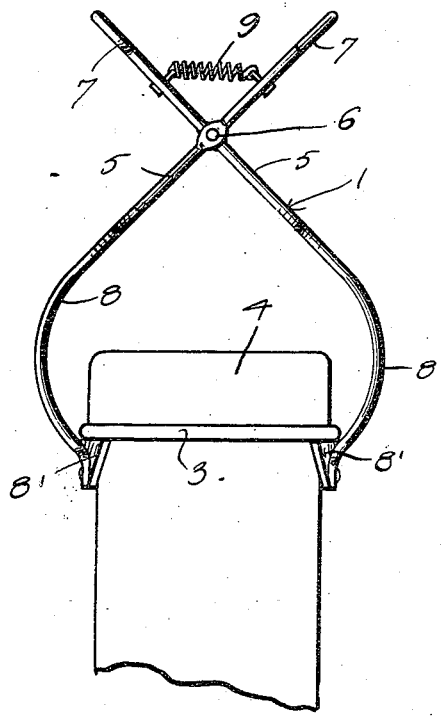
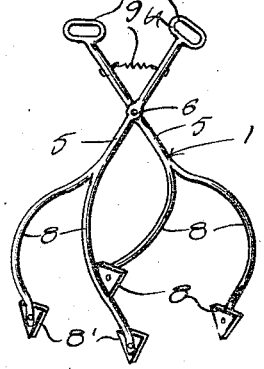
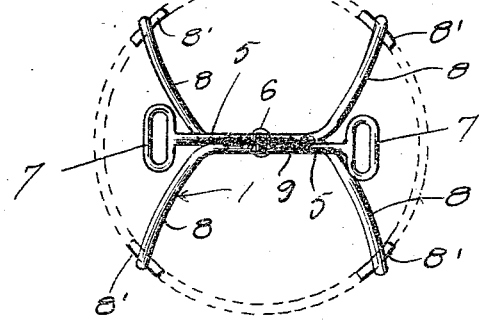
Inventor
J. Martelli Patented May 6, 1924.

1,493,362

UNITED STATES PATENT OFFICE.

JOHN MARTELLI, OF SCHENECTADY, NEW YORK.

ICE-CREAM TONGS.

Application filed January 25, 1922. Serial No. 531,746.

*To all whom it may concern:*

Be it known that I, JOHN MARTELLI, a citizen of the United States, residing at Schenectady, in the county of Schenectady and State of New York, have invented certain new and useful Improvements in Ice-Cream Tongs; and I do hereby declare the following to be a full, clear, and exact description of the invention, such as will enable others skilled in the art to which it appertains to make and use the same.

This invention relates to new and useful improvements in tongs adapted for lifting and carrying ice cream cans, and has for its primary object the provision of a device of the above stated character which may be easily and quickly applied and removed from a can, and when applied will firmly grip the can and evenly support the same to prevent spilling of its contents and said device shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention reference is to be had to the following description and accompanying drawings, in which:—

Figure 1 is a side elevation, illustrating my invention applied to an ice cream can, Figure 2 is a top plan view illustrating the same, Figure 3 is a perspective view illustrating the tongs.

Referring in detail to the drawings, the numeral 1 indicates tongs especially constructed for lifting and carrying an ice cream can 2 by engaging under the bead or rim 3 of the cover 4 and comprises a pair of straight levers 5 that are held in pivotal crossing relation by a pivot pin 6. The levers have formed on their upper ends, hand grips or looped handles 7. The levers below their pivotal connection are bifurcated to provide diverging and inwardly curved grapple elements 8 having formed integrally with their ends triangular shaped heads or can engaging elements 8' arranged in spaced pairs adapted to engage under the bead of the lid at oppositely arranged points of the can. A contractile spring 9 is secured to the levers above the pivots to urge their lower ends or grapple elements towards each other thereby providing self-closing tongs which will grip a can when the operator permits the handles to move towards each other and will remain applied to the can until the handles are manually moved away from each other.

From the foregoing description taken in connection with the accompanying drawings, it should be apparent that a device has been provided that effectively grips a can and will so support the can that any chances of the latter tilting will be obviated.

While I have shown and described the preferred embodiment of my invention, it will be understood that minor changes in construction, combination, and arrangement of parts may be made without departing from the spirit and scope of the invention as claimed.

Having thus described my invention what I claim is:—

A tongs for the purpose specified, the same comprising a pair of crossed levers pivotally connected and having handles formed at corresponding ends, the other end of the levers being bifurcated and curved toward each other and having their terminals downwardly turned and provided with elements forming enlarged gripping surfaces, the upper edges of said elements extending above the upper ends of said downwardly turned terminals, a contractile spring having one of its ends secured to each of said levers between the handles and the point of pivotal connection of the levers, and said contractile spring normally urging the gripping ends of the tongs toward each other, whereby when said tongs are applied to an object to be lifted they will be frictionally supported on said objects.

In testimony whereof I affix my signature in presence of two witnesses.

JOHN MARTELLI.

Witnesses:
  PIETRO DI COCCO,
  SANGINESI FRANCENO.